3,066,073
ANTACID: CALCIUM PHOSPHATE GEL-MAGNESIUM TRISILICATE
Karl A. Ratcliff, William A. Dorrance, and John P. Towey, Des Moines, Iowa, assignors, by mesne assignments, to Diamond Laboratories, Inc., Des Moines, Iowa, a corporation of Iowa
No Drawing. Filed Dec. 1, 1959, Ser. No. 856,382
5 Claims. (Cl. 167—55)

This application is a continuation-in-part of application Serial No. 699,951, filed December 2, 1957, now Patent No. 2,967,802, January 10, 1961.

The present invention relates to a gel of a salt of an alkaline earth metal and to novel uses thereof.

It is an object of the present invention to prepare novel gels of salts of alkaline earth metals.

Another object is to develop a composition suitable for relieving the symptoms associated with excessive gastric acidity, heartburn, sour eructations, chronic dyspepsia and similar distresses.

A further object is to develop a composition suitable for the treatment of peptic ulcers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the invention there is prepared a gel of a salt of an alkaline earth metal. The gel so prepared has various uses; thus it has sorptive properties whereby it can be used to concentrate proteins and antigens. It can also be used as a suspending agent, as a clarifying agent, as an immunological adjuvant, as a flocculating agent and as an oral detoxifying antiacid.

The gels are prepared by admixing an acid solution of an alkaline earth metal with an aqueous alkaline solution of a phosphate in a colloidal state. As the alkaline earth metal compounds there may be mentioned organic and inorganic salts of magnesium and calcium.

Typical starting compounds include magnesium carbonate, calcium carbonate, calcium chloride, magnesium chloride, calcium lactate and calcium gluconate.

The preferred starting materials are the calcium salts. For best results in obtaining a pure compound calcium carbonate is then dissolved in an acid solution, e.g., lactic acid. At least the theoretical amount of acid should be used to dissolve the calcium carbonate. In order to hasten the dissolution an excess of acid, e.g., 10%, is preferably employed.

To the calcium or other alkaline earth metal salt, e.g., calcium lactate, there is then added rapidly and with stirring aqueous ammonium phosphate in the presence of excess ammonia, e.g., sufficient to insure complete conversion of the $HPO_4^=$ to $PO_4^\equiv$, thus reducing possibility of $CaHPO_4$ formation. The pH preferably is not less than 9.1. This results in the formation of the gel. Sodium hydroxide or potassium hydroxide may be employed in place of ammonia.

The preferred novel gel of the instant invention is pure hydrated calcium phosphate of the formula $Ca_{10}(OH)_2(PO_4)_6$.

Tribasic calcium phosphate as normally prepared contains a mixture represented by the formula $$CA_{10}(OH)_2(PO_4)_6$$

together with adsorbed calcium and/or phosphate ions and contaminated with a variable quantity of $CaHPO_4$. There is also present carbonates formed as a byproduct in the manufacture of the tribasic calcium phosphate. These impurities, and especially the $CaPHO_4$ and carbonates markedly alter the physical and colloidal properties of the freshly manufactured material and it is due to their absence that the hydrated calcium phosphate of the instant invention has its unusual and unique properties.

The over-all chemical equation for the synthesis of the gel of the present invention can be represented as follows:

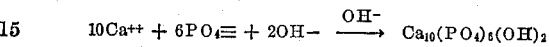

For best results the calcium compound and the phosphate should be used substantially in the amounts indicated by the equation, namely, 10 mols of calcium to 6 mols of phosphate.

*Example 1*

The product has an affinity for many organic and/or biological materials, for example, proteins, dyestuffs, and nitrogenous substances in general. It can be used to concentrate antigens including both proteantigens and other antigens.

(1) One thousand grams (10 mols) of pure calcium carbonate were dissolved in 2350 grams of 85% lactic acid (22 mols, i.e., theoretical quantity+10%) (U.S.P.) in 7.5 gallons of distilled water. The carbon dioxide formed was removed by boiling and the solution was mixed well.

(2) In a separate vessel 690 grams (6 mols of anhydrous $H_3PO_4$) of phosphoric acid (N.F. 85%) was dissolved in 7.5 gallons of distilled water. There was added 1790 cc. of aqueous ammonium hydroxide solution (28%) and the combination was well mixed. pH at this step is approximately 9.1. Eighteen mols of ammonia are required to convert the 6 mols of phosphoric acid to triammonium phosphate and the excess ammonia is needed to insure complete formation of $PO_4$ with a minimum of $HPO_4$.

(3) Then the basic ammonium phosphate solution was added rapidly with rapid stirring to the calcium lactate solution, or admixed simultaneously, and the resulting suspension allowed to stand overnight, or for 18 to 24 hours.

The supernatant liquid was decanted and the suspension filtered mechanically. The cake was washed four times with 7 to 10 gallons of distilled water. The final wash water was ammonia free as shown by Nessler's reagent. The cake was not allowed to dry during washing. Then the cake was placed in a calibrated container and brought to 5 gallons with distilled water and mixed well.

The above procedure produced a gel containing 935 grams dried solids (4.675% solids) and amounted to a yield of 93.5%. The gel had an acid combining power per gram of ignited material of 11.36 cc. of N/1 HCl; and ash of 4.37% and loss on ignition of 6.5%.

If the gel is to be stored for 3 days or longer ¼% formalin solution should be added as a preservative. In place of formalin other preservative such as phenol or chlorobutanol can be used.

The concentration of solids in the gel can be varied. The gel can contain as much as 15% solids but is usually more dilute.

The tricalcium phosphate gel is an excellent suspending agent and vehicle for inclusion in suspension-type products where it is advantageous to include insoluble solids among the active ingredients, and also has antiacid properties which make it a vehicle as well as an active ingredient in scour products for veterinary use and stomachic-intestinal products for human or veterinary use.

Typical scour formulations are:

Combination of sulfa drugs, kaolin, pectin, sodium thiosulfate, etc., in an aqueous suspension of gel in 2% to 15% concentration, depending upon quantities of solids present.

The calcium phosphate gel of the present invention has proven to be of particular value in the treatment of peptic ulcers and to relieve the symptoms associated with excessive gastric acidity, heartburn, chronic dyspepsia and similar distresses. For such uses it has been found to be particularly effective when employed together with magnesium trisilicate. Generally 5 to 20 grains of the calcium phosphate gel are employed with 5 to 10 grains of the magnesium trisilicate. Flavoring agents and the like can be added and the composition can also be made up as an aqueous suspension.

Typical stomachic-intestinal formulations are given in the following examples.

*Example 2*

|  | Grains |
|---|---|
| Calcium phosphate gel of Example 1 | 6 |
| Magnesium trisilicate | 9 | containing aromatics, flavoring agents in aqueous suspension.

*Example 3*

| | |
|---|---|
| Calcium phosphate gel of Example 1 | 20 grains/5 ml. |
| Magnesium trisilicate | 9 grains/5 ml. | in aqueous suspension with thickeners, flavoring agents, and preservatives.

*Example 4*

To 10 ml. of the product prepared in Example 3 (neo. gel suspension) were added 50 ml. of simulated gastric juice, U.S.P. XV (pH 1.25) at room temperature. The pH of the mixture, after vigorous shaking was determined at 2 and 5 minutes and at 10-minute intervals thereafter. Immediately after the 5-minute reading and after each subsequent 10-minute reading, 5 ml. of the mixture was removed, filtered and replaced with 5 ml. of simulated gastric juice. This procedure was repeated until the pH of the sample was reduced to 1.8. The pH was determined on each of the samples which were removed.

The initial neo. gel suspension had a pH of 8.5. The test samples for the first 40 minutes had a pH of 6 and this gradually lowered until at the end of 130 minutes from the start of the test the pH had dropped to 4. After about 180 minutes the pH had dropped to 1.8. It is generally recognized that an antacid should keep the pH at 4 and above. The neo. gel suspension was capable of doing this for over 2 hours.

*Example 5*

50 patients who had excessive gastric acidity as measured by direct gastric extraction and analysis were given the neo. gel suspension of Example 3. All patients started with a dose of 2 teaspoonfuls after each meal (3 times a day) and in some cases this was increased to 3 and even 4 teaspoonfuls. Half of the patients had peptic ulcer as shown by X-ray examination and the other half of the patients had a variety of other conditions, all associated with hyperacidity.

It was found that with those patients who had duodenal ulcers it was best to add the suspension 60 to 90 minutes after meals. In each case the dose was kept constant for at least 3 weeks before the test period was begun.

In the entire series of 50 patients good to excellent results were obtained in 42. All of these were willing to continue with the suspension indefinitely. In only 5 instances did the patients prefer to return to another antacid medication taken before the test period. In 8 cases the results were "no result" or fair.

Of the 25 patients with peptic ulcer 24 good to excellent results were obtained with 24 and a fair result in the last case. In two of the patients healing of the ulcer niche was seen.

In the 25 patients with a variety of other conditions, all of whom complained of heartburn and similar symptoms there were good to excellent results in 18 cases. The relatively poorer results obtained in this second group is explained by the fact that patients of this kind are more likely to have emotional and personality disorders and less likely to respond to any more of treatment.

Only 3 patients had any sort of side effect. Two complained of constipation while one had frequent bowel movements.

Unless otherwise stated, all parts and percentages are by weight.

In addition to the calcium phosphate gel and magnesium trisilicate the compositions of the present invention can be further enhanced by the addition of an anticholinergic drug, e.g. atropine, scopalamine, and related synthetic drugs, with or without a sedative. The results in such cases have been excellent in the treatment of peptic ulcers.

What is claimed is:

1. An antacid composition comprising a hydrated calcium phosphate gel consisting essentially of $$Ca_{10}(PO_4)_6(OH)_2$$

as the sole calcium phosphate constituent, said gel having been prepared by admixing an aqueous acid solution of a calcium salt with an aqueous alkaline solution of a phosphate, the ratio of the calcium ions to phosphate ions being approximately 10 to 6, the alkaline solution being of sufficient strength that after admixing with said acid solution the overall pH is at least about 9, and magnesium trisilicate.

2. An antacid composition consisting essentially of 2 parts of hydrated calcium phosphate gel having the formula $CA_{10}(PO_4)_6(OH)_2$, said gel having been prepared by admixing an aqueous acid solution of a calcium salt with an aqueous alkaline solution of a phosphate, the ratio of the calcium ions to phosphate ions being approximately 10 to 6, the alkaline solution being of sufficient strength that after admixing with said acid solution the overall pH is at least about 9, and 3 parts of magnesium trisilicate.

3. A method of alleviating the symptoms associated with excessive gastric acidity comprising orally feeding a patient having such symptoms a composition comprising a hydrated calcium phosphate gel consisting essentially of $Ca_{10}(PO_4)_6(OH)_2$ as the sole calcium phosphate constituent, said gel having been prepared by admixing an aqueous acid solution of a calcium salt with an aqueous alkaline solution of a phosphate, the ratio of the calcium ions to phosphate ions being approximately 10 to 6, the alkaline solution being of sufficient strength that after admixing with said acid solution the overall pH is at least about 9.

4. A method of alleviating the symptoms associated with peptic ulcer comprising orally feeding a patient having a peptic ulcer a mixture comprising a hydrated calcium phosphate gel consisting essentially of $$Ca_{10}(PO_4)_6(OH)_2$$

as the sole calcium phosphate constituent, said gel having been prepared by admixing an aqueous acid solution of a calcium salt with an aqueous alkaline solution of a phosphate, the ratio of the calcium ions to phosphate ions being approximately 10 to 6, the alkaline solution being of sufficient strength that after admixing with said acid solution the overall pH is at least about 9, and magnesium trisilicate.

5. A method according to claim 4 wherein said patient has a duodenal ulcer and the mixture is fed 60 to 90 minutes after meals.

References Cited in the file of this patent

Remington's Practice of Pharmacy, Mack Pub. Co., Easton, Pa., 1956, pages 497, 498 and 492.

Rogers' Inorganic Pharmaceutical Chemistry, Henry Kimpton, London, 1957, page 381.

Conn: Current Therapy, Saunders, Phila., July 6, 1959, pages 248, 250 and 251.